(12) United States Patent
Yamada et al.

(10) Patent No.: US 9,673,625 B2
(45) Date of Patent: Jun. 6, 2017

(54) UNINTERRUPTIBLE POWER SUPPLY APPARATUS

(71) Applicant: FUJI ELECTRIC CO., LTD., Kawasaki (JP)

(72) Inventors: Ryuji Yamada, Hachioji (JP); Kazuaki Mino, Hino (JP); Ryuji Shimizu, Kawasaki (JP); Hirokazu Kadoi, Ami-machi (JP); Koji Kawaguchi, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 338 days.

(21) Appl. No.: 14/642,675

(22) Filed: Mar. 9, 2015

(65) Prior Publication Data
US 2015/0180233 A1 Jun. 25, 2015

Related U.S. Application Data

(63) Continuation of application No. PCT/JP2013/057566, filed on Mar. 15, 2013.

(51) Int. Cl.
*H02J 9/00* (2006.01)
*H02J 1/08* (2006.01)
(Continued)

(52) U.S. Cl.
CPC ............... *H02J 1/08* (2013.01); *G06F 1/00* (2013.01); *H02J 1/102* (2013.01); *H02J 7/34* (2013.01);
(Continued)

(58) Field of Classification Search
CPC .... H02J 1/08; H02J 1/102; H02J 9/062; H02J 7/35; H02J 7/34; G06F 1/00; Y02B 10/72;
(Continued)

(56) References Cited

U.S. PATENT DOCUMENTS 5,616,968 A 4/1997 Fujii et al.
5,745,356 A * 4/1998 Tassitino, Jr. ............. H02J 3/46
307/32
(Continued)

FOREIGN PATENT DOCUMENTS

CN 102593942 A 7/2012
JP H01-180836 U 12/1989
(Continued)

OTHER PUBLICATIONS

Japanese Office Action with partial translation dated Nov. 10, 2015.

*Primary Examiner* — Kenneth B Wells
(74) *Attorney, Agent, or Firm* — Rabin & Berdo, P.C.

(57) ABSTRACT

An uninterruptible power supply apparatus includes a power supply unit converting AC power to generate a DC voltage to be supplied to a loading device. The uninterruptible power supply apparatus further includes a first battery unit connected to the power supply unit to receive a DC current therefrom, and stores first DC power generated from the DC voltage. The first battery unit generates a DC voltage to be supplied to the loading device from the first DC power. The uninterruptible power supply apparatus includes a second battery unit connected in parallel to the power supply unit and stores second DC power, and generates, from the second DC power stored in the second battery unit, a DC voltage to be supplied to the loading device. The uninterruptible power supply apparatus further includes a controller for controlling operation of the power supply unit, the first battery unit and the second battery unit.

19 Claims, 6 Drawing Sheets

(51) Int. Cl.
*H02J 7/34* (2006.01)
*G06F 1/00* (2006.01)
*H02J 1/10* (2006.01)
*H02J 7/35* (2006.01)
*H02J 9/06* (2006.01)

(52) U.S. Cl.
CPC ............. *H02J 7/35* (2013.01); *H02J 9/062* (2013.01); *Y02B 10/72* (2013.01); *Y02E 10/766* (2013.01); *Y10T 307/344* (2015.04); *Y10T 307/62* (2015.04)

(58) Field of Classification Search
CPC .. Y02E 10/766; Y10T 307/344; Y10T 307/62
See application file for complete search history.

(56) References Cited

U.S. PATENT DOCUMENTS

| | | | | |
|---|---|---|---|---|
| 6,215,202 | B1* | 4/2001 | Luongo | H02J 15/00 307/23 |
| 6,949,843 | B2* | 9/2005 | Dubovsky | H02J 3/382 307/64 |
| 7,547,990 | B2* | 6/2009 | Varzhabedian | H02J 7/027 307/66 |
| 8,344,545 | B2* | 1/2013 | Fuller | B60R 16/03 307/64 |
| 8,422,256 | B2* | 4/2013 | Giuntini | H02J 9/005 307/45 |
| 8,786,131 | B2* | 7/2014 | Chen | H02J 9/005 307/11 |
| 8,902,621 | B2* | 12/2014 | Yamada | H02M 7/219 363/129 |
| 9,093,861 | B2* | 7/2015 | Nakano | H02J 9/061 |
| 2013/0043729 | A1 | 2/2013 | Yoshida et al. | |

FOREIGN PATENT DOCUMENTS

| | | |
|---|---|---|
| JP | H05-207682 A | 8/1993 |
| JP | H05-276690 A | 10/1993 |
| JP | H06-261469 A | 9/1994 |
| JP | H07-184322 A | 7/1995 |
| JP | 3043973 U | 9/1997 |
| JP | 2001-103663 A | 4/2001 |
| JP | 2002-191126 A | 7/2002 |
| JP | 2005-227017 A | 8/2005 |
| JP | 2006-230029 A | 8/2006 |
| JP | 2011-083091 A | 4/2011 |
| JP | 2012-130158 A | 7/2012 |
| JP | 2012-143104 A | 7/2012 |
| JP | 2013-051879 A | 3/2013 |
| WO | WO-2011/135712 A1 | 11/2011 |

\* cited by examiner

FIG.4
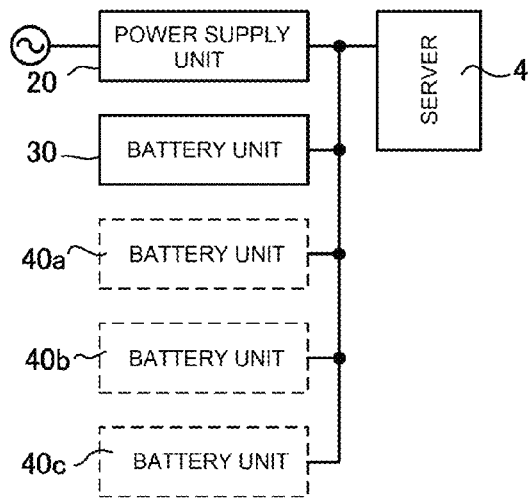
(a) DURING NORMAL OPERATION
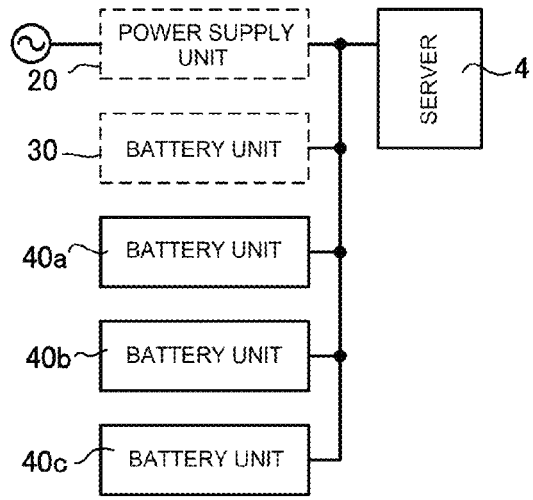
(b) DURING PEAK CUT
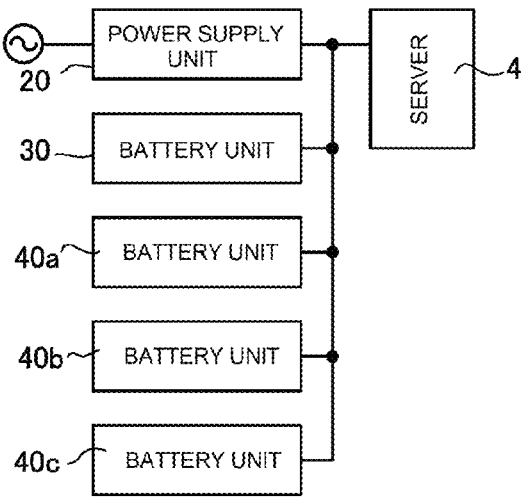
(c) STORING POWER DURING LATE NIGHT HOURS FIG.6
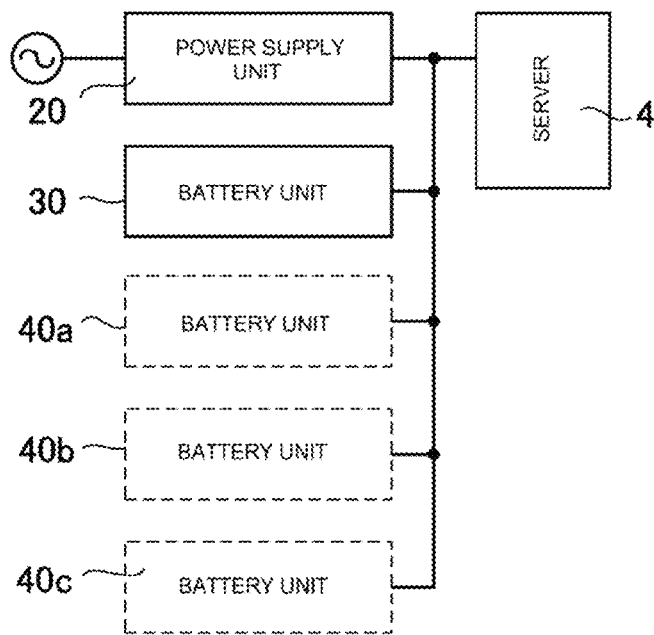
(a) DURING NORMAL OPERATION
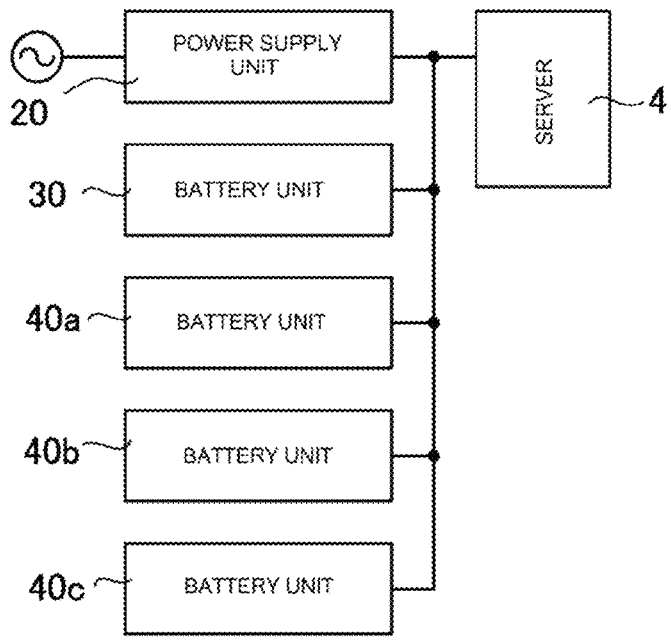
(b) DURING PEAK CUT/STORING POWER DURING LATE NIGHT HOURS

UNINTERRUPTIBLE POWER SUPPLY APPARATUS

This application is a continuation under 35 U.S.C. 120 of International Application PCT/JP2013/057566 having the International Filing Date of Mar. 15, 2013, which is fully incorporated herein by reference.

TECHNICAL FIELD

The present invention relates to an uninterruptible power supply apparatus capable of conserving electric energy by efficiently supplying power to a loading device in accordance with the amount of power required by the loading device and the availability of AC power.

BACKGROUND ART

FIG. 6 is a schematic configuration diagram of a general, conventional power supply system of a data center with a plurality of loading devices such as a plurality of servers that use DC voltage as the driving power supply. This power supply system has an uninterruptible power supply apparatus (UPS) 1 interposed in a 400 V system power supply, and an AC power distributor (PDU) 2 for converting high-voltage AC power (AC 400 V), supplied through the uninterruptible power supply apparatus 1, into, for example, 200 V or 100 V AC power.

The uninterruptible power supply apparatus 1 basically has a high-capacity battery (BAT) 1a capable of storing DC power. The uninterruptible power supply apparatus 1 is also configured by an AC/DC converter 1b for converting the high-voltage AC power to a DC voltage to charge the battery 1a, and a DC/AC converter 1c for converting the output voltage of the AC/DC converter 1b or the DC power stored in the battery 1a to high-voltage AC power and outputting the high-voltage AC power.

The power distributor 2 has, for example, a breaker 2a for separating the system power supply from a load system having the loading devices (servers). The AC power distributor 2 further has a transformer 2b for converting the high-voltage AC power (AC 400 V) to, for example, 200 V AC power and outputting the 200 V AC power. Note that reference numeral 3 shown in the diagram represents a transformer that converts AC power, which is distributed at, for example, 6.6 kV, into the high-voltage AC power (AC 400 V), and brings the high-voltage AC power into a building provided with the uninterruptible power supply apparatus 1 and the like.

The load system, constructed by the plurality of servers 4 serving as the loading devices, has, in front thereof, a switching power supply 5 that is connected to the power distributor 2 and generates low-voltage DC power of 48 V or lower (e.g., DC 12 V) from the AC power (AC 200 V) to drive the servers 4. This switching power supply 5 generally has an AC/DC converter 5a for converting the AC power (AC 200 V) into a DC voltage, and a DC/DC converter 5b for converting the output voltage of the AC/DC converter 5a into a DC output voltage (DC 12 V) to be supplied to the servers 4. The plurality of servers 4 are connected to the switching power supply 5 and operated by supply of the DC output voltage from the switching power supply 5, the DC output voltage being the driving power supply for the servers 4 (see Patent Document 1, for example).

The plurality of servers 4 are usually configured such that a certain number of servers 4 are stored in a server rack as a group of servers, and the switching power supply 5 is provided for each group of servers. The switching power supply 5 is stored in the server rack together with the certain number of servers 4. These servers 4 construct a so-called "multinode server."

Examples of the technique related to the uninterruptible power supply apparatus 1 of the foregoing power supply system include a technique disclosed in, for example, Patent Document 2 in which uninterruptible power supply apparatuses are run parallel. Patent Document 3 discloses a technique in which, when the number of uninterruptible power supply apparatuses to be run parallel are increased, the capacities of the batteries are changed by changing over the switches to connect only the batteries in parallel.

Patent Document 1: Japanese Unexamined Patent Application Publication No. 2012-143104

Patent Document 2: Japanese Unexamined Patent Application Publication H7-184322

Patent Document 3: Japanese Unexamined Patent Application Publication No. 2006-230029

DISCLOSURE OF THE INVENTION

It is not unusual that the amount of the power consumed in the data center reaches, for example, several hundreds of kilowatts or more. Therefore, the uninterruptible power supply apparatus 1 interposed in the system power supply as shown in FIG. 6 needs to be large enough to have a power capacity of at least several hundreds of kilowatts. Naturally, a large space to install the uninterruptible power supply apparatus 1 is needed. Furthermore, use of a plurality of the uninterruptible power supply apparatuses 1 in parallel as described in Patent Documents 2 and 3, leads to a complicated system configuration.

In the power supply system with the configuration shown in FIG. 6, it is undeniable that any problems in the uninterruptible power supply apparatus 1 could result in having an impact on all of the servers (loading devices) 4. In addition, the uninterruptible power supply apparatus 1 can only briefly deal with discontinued supply of the AC power from the system power supply (i.e., power outage) and cannot deal with a severe problem in supply of power that could occur in the system power supply. The uninterruptible power supply apparatus 1 also cannot deal with a change in the amount of power required by the loading devices.

The present invention was contrived in view of these circumstances, and an object thereof is to provide an uninterruptible power supply apparatus for, for example, a power supply system that supplies power to a loading device configured by a plurality of servers, the uninterruptible power supply apparatus being capable of achieving reduced power consumption by efficiently supplying power to the loading device in accordance with the amount of power required by the loading device and the availability of AC power.

In order to achieve this object, an uninterruptible power supply apparatus according to the present invention has:

a power supply unit that converts AC power supplied from a system power supply to generate a DC voltage to be supplied to a loading device;

a first battery unit that is connected in parallel to the power supply unit, has a first battery for storing DC power, and generates, from the DC power stored in the first battery, a DC voltage to be supplied to the loading device when the supply of the AC power is discontinued;

a second battery unit that is connected in parallel to the power supply unit, has a second battery for storing DC power, and generates, from the DC power stored in the second battery, a DC voltage to be supplied to the loading device in accordance with a load status of the power supply unit; and a controller for operating the power supply unit and the first and second battery units in a correlated manner in accordance with an amount of power required by the loading device.

Incidentally, the first battery is a high rate discharge battery capable of discharging power over a predetermined period of time, which is also referred to as a first maximum period of time. The second battery is a low rate discharge battery that has less current capacity than the first battery and is capable of discharging power longer than the first battery is. The first battery unit is configured to output the amount of current that is necessary to supply the loading device with the power required to continuously run the loading device over a predetermined period of time when the supply of the AC power is discontinued. The second battery unit is preferably configured by a plurality of battery units that are provided and run in parallel. The second battery is configured to supply the power required to run the loading device for a second maximum period of time that is longer than the first maximum period of time of the first battery unit by combining currents that are output from these battery units.

The controller is configured to selectively set one of the following modes, for example, in accordance with the amount of power required by the loading device and the availability of the AC power:

a first control mode for operating the power supply unit and the first battery unit while pausing the second battery unit;

a second control mode for pausing the power supply unit and the first battery unit while operating the second battery unit; and a third control mode for operating all the power supply unit and the first and second battery units. The controller may include instructions stored on a non-transitory, tangible computer readable storage medium to perform the instructions described herein related to the controller.

It is preferred that the first and second battery units be configured to charge the first and second batteries to store power therein, respectively, by inputting part of a current from the power supply unit.

The second battery unit may be configured by a plurality of battery units that are provided in parallel and each include a DC input-type battery unit for storing power by inputting part of a current from the power supply unit and an AC input-type battery unit for storing power by inputting the AC power. In this case, as a battery provided in the AC input-type battery unit (a third battery), it is preferred to use a low rate charge/discharge battery capable of supplying power to the loading device longer than the DC input-type battery unit does.

It is preferred that the power supply unit and the first and second battery units be disposed adjacent to each other in a rack in which a plurality of loading devices are installed.

According to the uninterruptible power supply apparatus with such a configuration, the first battery unit provided in parallel with the power supply unit can be used as a measure to deal with a power outage, and the second battery unit can be used as an auxiliary unit for supplementing the power supply capability of the power supply unit in accordance with the amount of power required by the loading device and the availability of the AC power. Therefore, while the original functions of the uninterruptible power supply apparatus are established by the first battery unit, the operation of the second battery unit can be controlled, resulting in a reduction of the burden on the power supply unit and hence its power consumption.

More specifically, the controller operates the power supply unit and the first and second battery units in a correlated manner in accordance with the amount of power required by the loading device. Therefore, the peak power consumption of the power supply unit can be cut when, for example, the problem in supply of power becomes severe in the system power supply. Furthermore, when the power consumption of the power supply unit increases as a result of an increase in the power consumption of the loading device, the second battery unit supplies power to the loading device, evening out the power consumption of the power supply unit. The uninterruptible power supply apparatus with such a configuration, therefore, can conserve electric power by efficiently supplying power to the loading device in accordance with the amount of power required by the loading device and the availability of the AC power.

In addition, unlike in the conventional power supply systems, this uninterruptible power supply apparatus with such a configuration does not have to be disposed together with the other high-capacity uninterruptible power supply apparatuses concentrically in the system power supply, and can therefore be installed with respect to, for example, each of the individual loading devices having a predetermined power capacity or lower. This facilitates in compact formation of a power supply system without the need to secure a special space in a data center to install a high-capacity uninterruptible power supply apparatus. The present invention, therefore, can provide an uninterruptible power supply apparatus that not only accomplishes high efficiency and space conservation of the entire power supply system but also conserves electric energy while reducing the equipment cost.

BRIEF DESCRIPTION OF THE DRAWINGS

FIG. 4 is a diagram, schematically showing an operation form for cutting the peak power consumption of the uninterruptible power supply apparatus shown in FIG. 1;

FIG. 5 is a diagram, schematically showing an operation form for evening out the power consumption of the uninterruptible power supply apparatus shown in FIG. 1.

DETAILED DESCRIPTION OF INVENTION

An uninterruptible power supply apparatus according to an embodiment of the present invention is described hereinafter with reference to the drawings.

Figure 1:
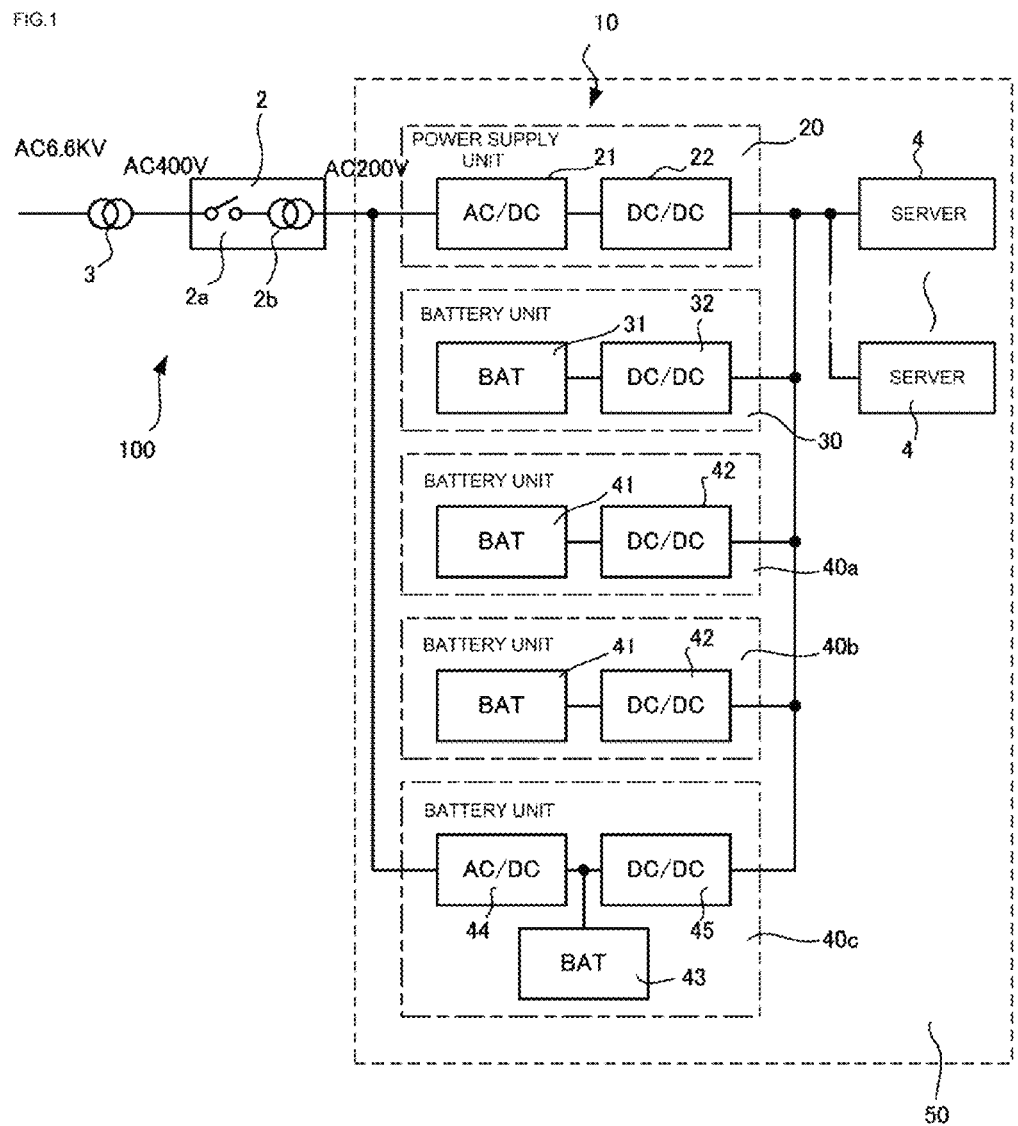
FIG. 1 is a diagram showing a schematic configuration of an uninterruptible power supply apparatus according to an embodiment of the present invention and a schematic configuration of a power supply system constructed with the uninterruptible power supply apparatus.

FIG. 1 is a schematic configuration diagram of a power supply system 100 constructed with an uninterruptible power supply apparatus 10 according to an embodiment.

This power supply system 100 is a favorable system for supplying a DC voltage of 12 V to each of a plurality of servers (loading devices) 4 constructing a multimode server in, for example, a data center, to drive the servers 4. Note in FIG. 1 that the components same as those of a conventional power supply system are given same reference numerals.

This power supply system 100 has an AC power distributor (PDU) 2 connected to a 400 V system power supply and supplies AC power to a server rack 50 through this power distributor 2, the server rack 50 having the plurality of servers (loading devices) 4 stored therein. In the power supply system 100 shown in FIG. 1, a transformer 2b is incorporated in the power distributor 2 to convert high-voltage AC power (AC 400 V), supplied from the system power supply, into 200 V AC power and supply it to the load side (the server rack 50). Note that the AC power (AC 400 V) can also be supplied directly to the load side via the power distributor 2.

The server rack 50 having the plurality of servers (loading device) 4 stored therein is provided with the uninterruptible power supply apparatus 10 according to the present invention for supplying power to a predetermined number of servers 4 installed in the server rack 50. This uninterruptible power supply apparatus 10 has a power supply unit 20 that inputs the AC power (AC 200 V) and outputs DC power of a predetermined voltage (DC 12V) to be supplied to the servers 4. The uninterruptible power supply apparatus 10 also has first and second battery units 30 and 40 provided in parallel with the power supply unit 20.

The first and second battery units 30 and 40 have batteries 31 and 41 for storing DC power, respectively, which function to generate, from DC power stored in the batteries 31 and 41, DC power of a predetermined voltage (DC 12 V) to be supplied to the servers 4, and outputs the generated DC power. The first battery unit 30 serves as a power outage backup to supply power to the servers 4 on behalf of the power supply unit 20 when the supply of the AC power (AC 200 V) is discontinued. The first battery unit 30, therefore, is configured to supply the power to the servers 4 continuously and promptly during a period in which the servers 4 might deal with a power outage when the supply of the AC power is stopped.

On the other hand, the second battery unit 40 assists the power supply unit 20 in supplying the power to the servers 4 when the electric power demand for the power supply unit 20 becomes strong due to, for example, an increase in the amount of power required by the servers 4. Therefore, compared to the first battery unit 30 that is required to supply a large amount of power in a short time when a power outage is detected as described above, the second battery unit 40 is configured to be able to supply the power to the servers 4 for somewhat a long period of time to keep the servers 4 running.

The uninterruptible power supply apparatus 10 according to the present invention is also configured by the power supply unit 20 and the first and second battery units 30 and 40 provided in parallel with the power supply unit 20. Especially in this embodiment, a plurality of second battery units 40, e.g., three second battery units 40a, 40b and 40c, are provided in parallel. Of these second battery units, the two second battery units 40a and 40b are used temporarily as appropriate when the foregoing electric power demand is strong. The remaining one second battery unit 40c, on the other hand, is used on a daily basis in assisting the power supply unit 20. The battery unit 40c, therefore, is configured to be able to, for example, store power during late night hours in which the electric power demand is low and supply the power to the servers 4 during midday hours in which the electric power demand is high.

Figure 6:
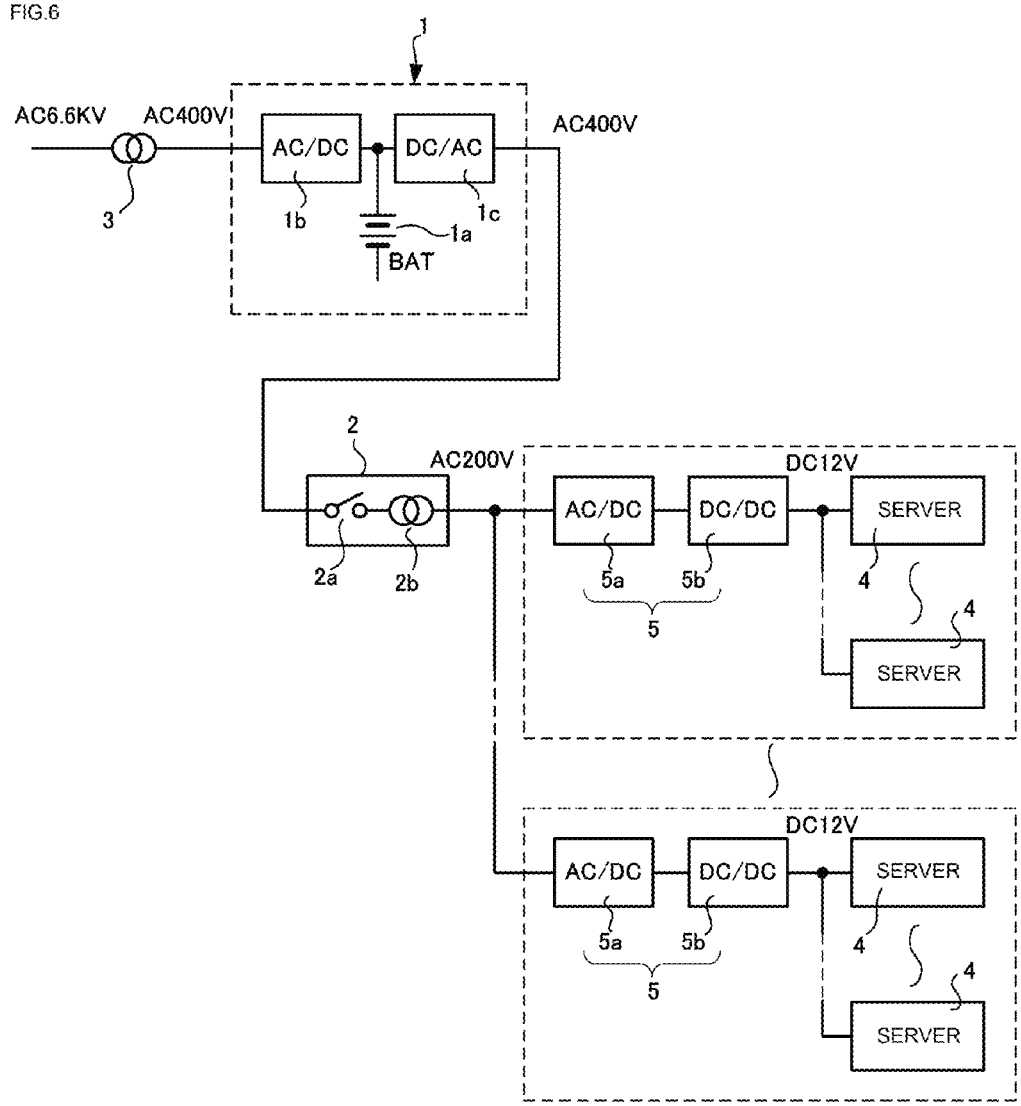
FIG. 6 is a schematic configuration diagram of a general, conventional power supply system of a data center with a plurality of servers.

The power supply unit 20 is also configured by an AC/DC converter 21 for converting the AC power (AC 200 V) to a DC voltage, and a DC/DC converter 22 for converting this output voltage of the AC/DC converter 21 into a DC voltage (DC 12 V) to be supplied to the servers 4. The power supply unit 20 is equivalent to the switching power supply 5 shown in FIG. 6. The AC/DC converter 21 and DC/DC converter 22 configuring the power supply unit 20, therefore, correspond to the AC/DC converter 5a and DC/DC converter 5b of the switching power supply 5.

The first battery unit 30 has the first battery 31 for storing DC power in a short time at the time of a power outage, and a bidirectional DC/DC converter 32 used for charging/discharging the first battery 31. The bidirectional DC/DC converter 32 inputs part of the DC current that is output by the power supply unit 20 when the power supply unit is operated, to charge the first battery 31. The bidirectional DC/DC converter 32 also discharges the first battery 31 when the operation of the power supply unit 20 is stopped due to discontinued supply of the AC power (i.e., power outage), generates the DC voltage (DC 12 V) from the DC power stored in the first battery 31, and supplies the generated DC voltage to the servers 4.

On the other hand, those two second battery units 40a and 40b out of the three second battery units 40 are used temporarily as appropriate when the electric power demand becomes strong as described above. The battery units 40a and 40b, therefore, are configured to be easily incorporated in the power supply system in preference to enhancing the conversion efficiency thereof. Thus, the battery units 40a and 40b are each realized as a DC input-type battery unit that stores power by inputting, for example, part of the current from the power supply unit 20.

The remaining second battery unit 40c is operated and controlled on a daily basis concurrently with the power supply unit 20 and functions to store power during late night hours. Therefore, the second battery unit 40c is configured as an AC input-type battery unit for storing power by inputting, for example, the AC power. Incidentally, if the second battery unit 40c is configured to store power only during late night hours, a low cost operation of the power supply system can be achieved, coupled with the tendency that the electric bills for late night hours are generally low.

Specifically, these two second battery units 40a and 40b each have the second battery 41 for storing DC power, and a bidirectional DC/DC converter 42 used for charging/discharging the second battery 41. The bidirectional DC/DC converter 42 inputs part of the DC current that is output by the power supply unit 20 when the power supply unit 20 is operated, to charge the second battery 41. The bidirectional DC/DC converter 42 also discharges the second battery 41 in accordance with the load status of the power supply unit 20, generates the DC voltage (DC 12 V) from the DC power stored in the second battery 41, and supplies the generated DC voltage to the servers 4.

The third set of the second battery unit 40c, on the other hand, has a third battery 43 for storing DC power and an AC/DC converter 44 for converting the AC power into a DC voltage to charge the third battery 43. The second battery unit 40c further has a DC/DC converter 45 for discharging the third battery 43 in accordance with the load status of the power supply unit 20, generates the DC voltage (DC 12 V) from the DC power stored in the third battery 43, and supplies the generated DC voltage to the servers 4.

The second battery unit 40c, which is configured to simply convert the AC power into a DC voltage to charge the third battery 43 and convert the power stored in the third battery 43 to supply it to the servers 4, is advantageous in reducing the loss incurred from power conversion, more than the first battery unit 30 and the second battery units 40a and 40b can, enhancing the conversion efficiency thereof.

The first battery 31 of the first battery unit 30 is configured by a high rate discharge battery capable of discharging a required power over a predetermined period of time (e.g., 5 minutes) to allow the servers 4 to deal with a power outage, the high rate discharge battery having a power capacity of, for example, 2.5 kW. The bidirectional DC/DC converter 32 is realized as having a power capacity enough to convert the power obtained from the first battery 31 and output the DC voltage (DC 12 V) at the maximum current of, for example, 208 A. Therefore, the first battery unit 30 is capable of supplying the power required for continuously operating the servers 4 for a predetermined period of time when the supply of the AC power is discontinued. In other words, the first battery unit 30 can supply the maximum current of 208 A to the servers 4 for five minutes.

The two second batteries 40a and 40b simply serves to assist the power supply unit 20. For this reason, a low rate discharge battery that has a lower current capacity than the first battery 31, is capable of discharging power longer than the first battery 31 is, and has a power capacity of, for example, 0.5 kW, is used as the second battery 41 of each of the two second battery units 40a and 40b. The bidirectional DC/DC converter 42 is realized as having a power capacity enough to convert the power obtained from the second battery 41 and output the DC voltage (DC 12 V) at the maximum current of, for example, 42 A. The second battery units 40a and 40b, therefore, are capable of supplying the maximum current of 42 A to the servers 4 for 50 minutes.

The third battery 43 of the second battery unit 40c is used to assist the power supply unit 20 by being repeatedly charged/discharged on a daily basis, as described above. For this reason, a low rate charge/discharge battery that has a larger capacity than the second battery 41, is capable of discharging power longer than the second battery 41 is, and has a power capacity of, for example, 1 kW, is used as the third battery 43. The third battery 43 is charged by the AC/DC converter 44 with a power of, for example, 0.2 kW for eight hours. The DC/DC converter 45 is also realized as having a power capacity enough to convert the power obtained from the third battery 43 and output the DC voltage (DC 12 V) at the maximum current of, for example, 83 A. The second battery unit 40c, therefore, is capable of supplying the maximum current of 83 A to the servers 4 for 120 minutes.

The currents that are output from the three second battery units 40a, 40b and 40c are combined at output ends of the second battery units 40a, 40b and 40c and supplied to the servers (loading devices) 4. Thus, the minimum current necessary to operate the servers 4 (42 A+42 A+83 A=167 A) is supplied from the second battery units 40a, 40b and 40c to the servers (loading devices) 4.

The AC/DC converter 21 provided in the power supply unit 20 and the AC/DC converter 44 provided in the second battery unit 40c serve to convert high-voltage AC power (AC 200 V) to a predetermined DC voltage (DC 400 V), as described above. Incidentally, in the case where the AC/DC converters 21 and 44 are each constructed with a general two-level power conversion circuit, the semiconductor switching element thereof (e.g., MOS-FET, IGBT, etc.) is normally required to have a withstand voltage of 500 V or higher.

The AC/DC converters 21 and 44 of this type are preferably configured with, for example, a three-level neutral point clamp power conversion circuit. This type of three-level neutral point clamp power conversion circuit is described in detail in, for example, Japanese Unexamined Patent Application Publication No. 2012-253981 and Japanese Unexamined Patent Application Publication No. 2011-223867. The three-level neutral point clamped power conversion circuit is capable of reducing the voltage added to the semiconductor switching element to approximately half the voltage input thereto.

According to this embodiment, therefore, the AC/DC converters 21 and 44 can each be constructed inexpensively using a relatively inexpensive semiconductor switching element of excellent performance that has a withstand voltage of, for example, approximately 300 V. The power conversion efficiency itself of the semiconductor switching element can also be enhanced by reducing the loss that incurs therein, facilitating in compact formation of the power supply unit 20 and the battery unit 40c that input AC power, with the DC/DC converters 22 and 45 therein respectively. This effect is prominent in the AC/DC converters that convert the high-voltage AC power AC 200 V to a DC voltage of 400 V.

Figure 2:
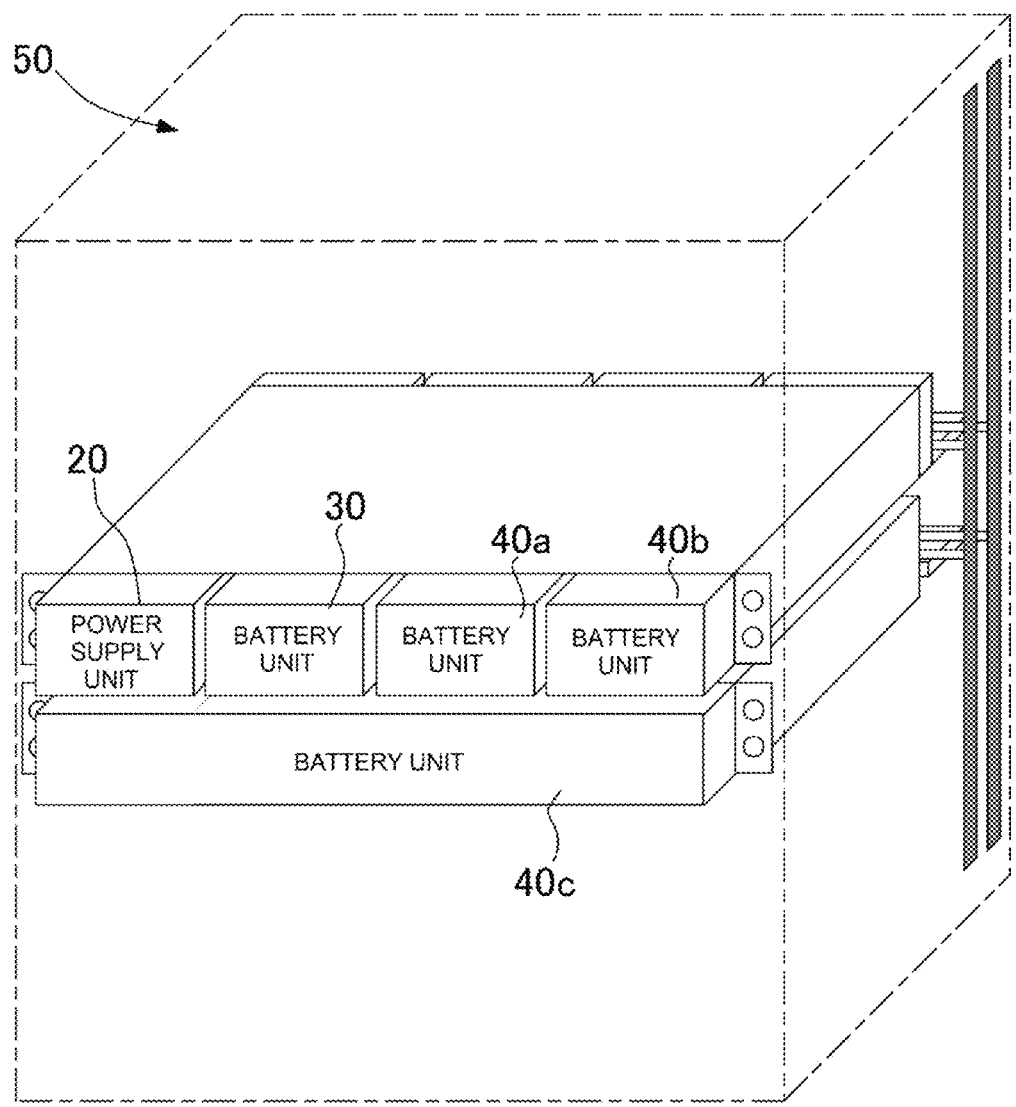
FIG. 2 is a diagram showing an example in which the uninterruptible power supply apparatus shown in FIG. 1 is installed in a server rack.

FIG. 2 shows an example in which the uninterruptible power supply apparatus 10 with the foregoing configuration is installed in the server rack 50. This server rack 50 has a size complying with, for example, the Electronic Industries Association ("EIA") standard so that the plurality of servers (loading devices) 4 can be installed vertically therein. The power supply unit 20, first battery unit 30, and second battery units 40a, 40b and 40c that configure the uninterruptible power supply apparatus 10 are unitized therein, with the circuit parts thereof stored in casings that are provided independently from each other.

Specifically, the power supply unit 20, first battery unit 30, and two battery units 40a and 40b out of the second battery units 40a, 40b and 40c are stored in the casings that are obtained by dividing the size of the basic storage of the server rack 50 into N (N is a natural number of 2 or more) along the width direction; thus, by dividing, for example, 1 unit size (1 U size) of the basic storage into 4 along the width direction, each of the casings can be ¼ the size (referred to as 1 U 4 size here) of the basic storage. The battery unit 40c, on the other hand, mounted with the large-capacity third battery 43, is stored in a casing of the size of the basic storage of the server rack 50 (1 U size).

FIG. 2 shows an example in which the units 20, 30, 40a, 40b, and 40c are stored in the server rack 50. Specifically, the power supply unit 20, first battery unit 30, and two second battery units 40a and 40b that are stored in the respective casings of 1 U 4 size are installed horizontally in a single storage shelf of the server rack 50. The second battery unit 40c stored in the 1 U-size casing is installed in a storage shelf immediately below (or above) the storage shelf in which the power supply unit 20 and the like are installed.

The units 20, 30, 40a, 40b, and 40c have the respective DC terminals connected in parallel on the rear surface side of the server rack 50, to construct the uninterruptible power supply apparatus 10, the DC terminals outputting the DC voltage (DC 12 V). Note that the units 20, 30, 40a, 40b, and 40c are connected in parallel to DC power supply lines by connectors (not shown), the DC power supply lines being laid, for example, on the rear surface side of the server rack 50 and connected to the plurality of servers (loading devices) 4. In this configuration, the DC voltage (DC 12 V) is supplied to the servers (loading devices) 4 via the DC power supply lines.

The connectors that are provided on the rear surface side of the casings of the power supply unit 20 and battery units 30, 40a, 40b, and 40c respectively are each configured by either a pair of plug-in connection plugs or a connection plug seat. The DC power supply lines are each provided with the other one of the pair of connection plugs or the connection plug seat. The connectors configured by a pair of plug-in connection plugs are coupled to the units 20, 30, 40a, 40b, and 40c when these units are installed in the server rack 50, and are disconnected when the units 20, 30, 40a, 40b, and 40c are removed from the server rack 50.

This example illustrates a case in which single-phase AC power (AC 200 V/AC 400 V) is input; however, when inputting three-phase AC power, the power supply unit 20 is provided for each of the phases of the three-phase AC power supply (R, S, T). Then, the first and second battery units 30, 40a, 40b, and 40c are provided for each of these power supply units 20 of these phases. In this case, for instance, the power supply units 20 and the battery units 30, 40a and 40b for the phases (R, S, T) are stored horizontally in six storage shelves that are adjacent to each other vertically in the server rack 50.

The power supply unit 20 and battery units 30, 40a, 40b, and 40c configuring the uninterruptible power supply apparatus 10 are combined by, for example, serial communication connectors (not shown). In this configuration, the units 20, 30, 40a, 40b, and 40c communicate information with one another, and the operations of the units 20, 30, 40a, 40b, and 40c are controlled in accordance with, for example, the load status of the power supply unit 20, the amount of power required by the servers (loading devices) 4, and the availability of the power of the AC power supply (AC 200 V/AC 400 V). For example, the load status may be related to a case where the processing burden (load) on the servers (loading devices) 4 increases or where the amount of power consumed by the servers (loading devices) 4 needs to be lowered, so that the units 20, 30 are in a pause state, and the units 40a, 40b, and 40c supply the DC voltage to the (loading devices) servers 4.

Placing the uninterruptible power supply apparatus 10 close to the servers 4 that are installed in the server rack 50 enables the supply of power to the servers 4 without unnecessarily pulling around the DC power supply lines. Therefore, the DC power supply lines can be formed into the minimum wire length. Consequently, the loss incurred from the DC power supply lines can be reduced sufficiently even when a large current flows through the DC power supply lines at a low voltage (DC 12 V).

Moreover, the shorter the wire length (constructed length) of the DC power supply lines from the uninterruptible power supply apparatus 10 to the servers 4, the lower the wiring inductances thereof can be. Thus, even when the load power of the servers 4 changes drastically, the uninterruptible power supply apparatus 10 can be caused to response rapidly to such a change. Consequently, the fluctuation of the DC voltage (DC 12 V) to be supplied to the servers 4 can be minimized, thereby stabilizing the DC voltage (DC 12 V).

The amount of power required by the servers (loading devices) 4 in the data center is now described. Suppose that the data center has a non-utility generation facility and a photovoltaic power facility. In this case, the amount of power that can be supplied by the data center itself is the amount obtained by adding a photovoltaic power generation amount B to a base generation amount A, as shown schematically in FIG. 3, and the total generation amount fluctuates depending on the photovoltaic power generation amount B.

Figure 3:
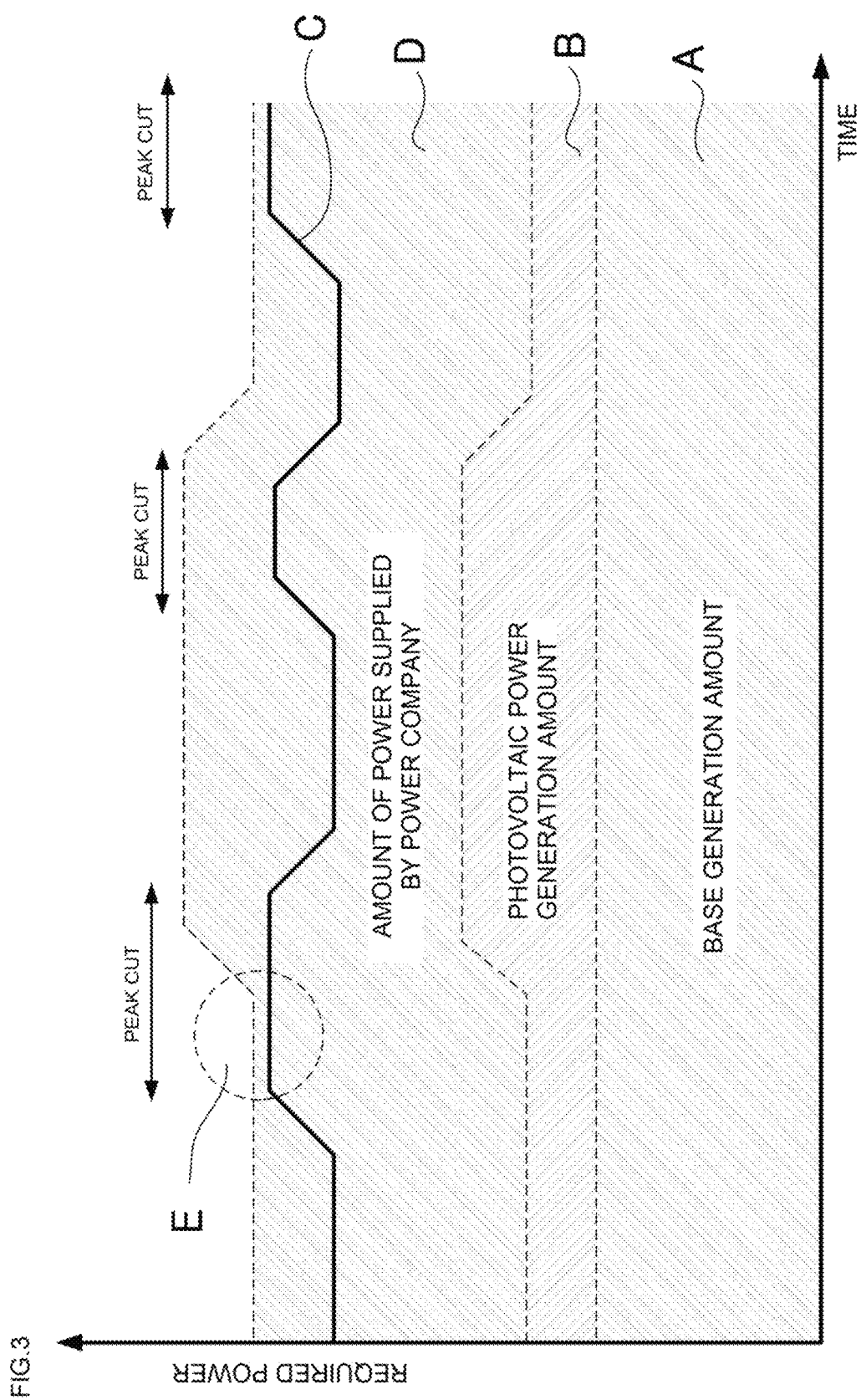
FIG. 3 is a diagram showing a model of the relationship between the amount of power supplied and the amount of power required.

On the other hand, the amount of power required to operate (run) the servers (loading devices) 4 changes to a certain degree as with the lapse of time, as shown by, for example, the solid line C in FIG. 3. In the case where the amount of the load power (the amount of power required) C exceeds the amount of power (total generation amount) supplied by the data center, the data center needs to receive power from a power company through the system power supply. Especially in the case where the maximum amount of power D supplied by the power company is regulated by the agreement or the like, the excess amount of power for operating (running) the servers (loading devices) 4 might run short, as shown by the broken line E in FIG. 3.

It is, therefore, preferred to secure a certain amount of excess power to stably operate (run) the servers (loading devices) 4 continuously, by estimating a drastic increase in the load of the servers 4. Running short on the excess amount of power could also happen when receiving power only from the power company. In some cases, the amount of power supplied becomes limited or the supply of power itself is discontinued (power outage) due to the problems of availability of power of the power company.

In order to deal with changes in the power circumstances, the uninterruptible power supply apparatus 10 according to the present invention controls the operations of the power supply unit 20 and of the battery units 30, 40a, and 40b. Especially by efficiently controlling the operation of the power supply unit 20, the power can stably be supplied to the servers (loading devices) 4, while reducing the load on the power supply unit 20. According to this configuration, the operational costs of the uninterruptible power supply apparatus 10 associated with the AC power supplied by a power company, can be reduced.

FIG. 4 shows an operation form of the uninterruptible power supply apparatus 10 for executing peak cut control. During a normal operation of the uninterruptible power supply apparatus 10 in which the processing burden (load) on the servers (loading devices) 4 is relatively low, only the power supply unit 20 and the first battery unit 30 provided as a measure to deal with a power outage are operated, as shown in FIG. 4(a). Meanwhile, the operations of the second battery units 40a, 40b and 40c that are provided as the backups to reduce the processing burden in the power supply unit 20, are paused so that the second battery units 40a, 40b and 40c do not discharge power and do not further accumulate power in the second battery units 40a, 40b and 40c. That is, when a respective unit is paused it cannot or does not discharge power and does not accumulate further power. In contrast, when a respective unit is operated, the respective unit does discharge power and accumulate further power.

During this normal operation, therefore, the power is supplied to the servers (loading devices) 4 only from the power supply unit 20. When the supply of AC power to the power supply unit 20 is discontinued (when a power outage occurs), the first battery unit 30 supplies the power to the servers (loading devices) 4 on behalf of the power supply unit 20. The first battery unit 30 supplies the DC power (DC 12 V) at the maximum current of, for example, 208 A for five minutes by using the DC power that is stored in the high rate discharge battery 31 having a power capacity of 2.5 kW as described above.

On the other hand, in the case where the processing burden (load) on the servers (loading devices) 4 increases or where the amount of power consumed by the servers (loading devices) 4 needs to be lowered, peak cut control is executed. In the peak cut control, the operations of the power supply unit 20 and of the first battery unit 30 provided as a measure to deal with a power outage are discontinued, as shown in FIG. 4(b). Meanwhile, the second battery units 40a, 40b and 40c are operated, so that the power is supplied from these second battery units 40a, 40b and 40c to the servers (loading devices) 4.

The second battery units 40a, 40b and 40c supply the DC power (DC 12 V) at the maximum current of, for example, 167 A for 50 minutes. The DC power (DC 12 V) supplied in this manner is obtained as a sum of the power that is acquired from each of the two low rate discharge batteries 41 capable of discharging low electric power for a long period of time and the power that is acquired from the large-capacity low rate charge/discharge battery 43 capable of discharging low electric power for a long period of time.

This operation form of the uninterruptible power supply apparatus 10 during the peak cut can discontinue the operation of the power supply unit 20 and charge only the battery unit 40c with low power. Therefore, apparently, the amount of the AC power to be received can be lowered, while keeping the operation of the uninterruptible power supply apparatus 10 stopped with respect to the AC power. In addition, while supplying power to the servers (loading devices) 4 constantly and stably, the amount of AC power consumed by the uninterruptible power supply apparatus 10 can be reduced significantly.

During the late night hours in which the processing burden (load) on the servers (loading devices) 4 is generally low and the AC power supplied by a power company is inexpensive, the uninterruptible power supply apparatus 10 is operated in a manner shown in FIG. 4(c). In other words, the power supply unit 20, first battery unit 30, and second battery units 40a, 40b and 40c are operated simultaneously. Using an excess amount of the DC power supplied from the power supply unit 20 to the servers (loading devices) 4, the batteries 31 and 41 of the first battery unit 30 and the second battery units 40a and 40b are charged. At the same time, the battery 43 of the second battery unit 40c is charged using the AC power.

The operation form for storing power during the late night hours stores the DC power in each of the first and second battery units 30, 40a, 40b, and 40c, preparing for the normal operation and the operation form corresponding to the peak cut control described above. Moreover, charging the second battery units 30, 40a, 40b, and 40c with low electric power for a long period of time as described above does not increase the processing burden on the power supply unit 20 significantly. Consequently, the power supply unit 20 can be operated with plenty of electric power.

On the other hand, in the case where the load of the servers (loading devices) 4 increases briefly, the following demand shift control is executed. As with the foregoing peak cut control, the demand shift control is basically operates only the power supply unit 20 and the first battery unit 30 during the normal operation, as shown in FIG. 5(a). Meanwhile, the operations of the second battery units 40a, 40b and 40c are paused.

When the load of the servers (loading devices) 4 is increased briefly, the power supply unit 20, first battery unit 30, and second battery units 40a, 40b and 40c are operated simultaneously, as shown in FIG. 5(b). In this case, the load status (the amount of power required) of the servers (loading devices) 4, the amount of power output by the power supply unit 20 (the amount of output current) the amount of DC power stored in the batteries 41 and 43 of the second battery units 40a, 40b and 40c, are obtained through the communications of information among the units 20, 30, 40a, 40b, and 40c described above. In response to this information, the demand shift control is executed by controlling the power output from each of the battery units 40a, 40b and 40c (output current).

However, the DC power is not output from the first battery unit 30 when the demand shift control is executed. In other words, the first battery unit 30 is disassociated from the demand shift control, and, therefore, the DC power is output from the first battery unit 30 only when a power outage of the AC power supply occurs.

The demand shift control is performed for the purpose of evening out the amount of power consumed by the power supply unit 20 per unit time (e.g., 30 minutes) when the load of the servers (loading devices) 4 increases briefly. Therefore, the demand shift control is executed when the amount of power consumed by the power supply unit 20 exceeds a predetermined amount of power as a result of an increase in the load of the servers (loading devices) 4. Consequently, the power is supplied from the second battery units 40a, 40b and 40c to the servers (loading devices) 4, to assist the power supply unit 20 in supplying the power to the servers 4. This results in a reduction of the amount of power supplied from the power supply unit 20 by the amount of power supplied from the second battery units 40a, 40b and 40c to the servers (loading devices) 4.

As a result, the average amount of power supplied by the power supply unit 20 per unit time (e.g., 30 minutes) can be reduced, while stably supplying the DC power to the servers (loading devices) 4. Consequently, the amount of power consumed by the power supply unit 20 can be evened out, and the amount of AC power used, which is charged in relation to the average amount power supplied per unit time described above, can be reduced. In addition, the amount of load applied to the power supply unit 20 can be reduced, while operating the servers (loading devices) 4 continuously and stably in such a manner that a large load is applied thereto, reducing the power consumption of the power supply unit 20. Consequently, electric power conservation in the uninterruptible power supply apparatus 10 can be accomplished, coupled with the effect of reducing the processing burden in the power supply unit 20, which is practically a great advantage for operating the uninterruptible power supply apparatus 10.

The present invention is not limited to the foregoing embodiment. For example, the size of the casings for the power supply unit 20 and battery units 30, 40a, 40b, and 40c may, of course, be ½ or ⅓ the 1 unit size (1 U size) by dividing 1 unit size into two or three along the width direction. It goes without saying that the number and power capacities of the battery units 30, 40a, and 40b to be connected in parallel to the power supply unit 20 are not particularly limited. In addition, the present invention can be modified in various ways without departing from the scope of the present invention.

The invention claimed is:

1. An uninterruptible power supply apparatus, comprising:
   a power supply unit that converts AC power to generate a DC voltage to be supplied to a loading device;
   a first battery unit that is connected to the power supply unit to receive a DC current therefrom, the first battery unit having a first battery for storing first DC power, and generates, from the first DC power stored in the first battery, a DC voltage to be supplied to the loading device when the supply of the AC power to the loading device is discontinued;

a second battery unit that is connected in parallel to the power supply unit, has a second battery for storing second DC power, and generates, from the second DC power stored in the second battery, a DC voltage to be supplied to the loading device in accordance with a load status of the power supply unit; and a controller that controls operation of the power supply unit, the first battery unit and the second battery unit in a correlated manner in accordance with an amount of power required by the loading device.

2. The uninterruptible power supply apparatus according to claim 1, wherein the first battery is a high rate discharge battery capable of discharging power for a first maximum period of time, and the second battery is a low rate discharge battery that has less current capacity than that of the first battery and is capable of discharging power for a second maximum period of time that is longer than the first maximum period of time.

3. The uninterruptible power supply apparatus according to claim 1, wherein the first battery unit supplies power required to continuously run the loading device for a first maximum period of time when the supply of the AC power is discontinued, and the second battery unit has a plurality of battery units that are provided and run in parallel, and supplies power required to run the loading device for a second maximum period of time that is longer than the first maximum period of time by combining currents that are output from said plurality of battery units.

4. The uninterruptible power supply apparatus according to claim 3, wherein the power supplied by the first battery unit corresponds to the DC voltage to be supplied to the loading device when the supply of the AC power is discontinued, and the power supplied by the second battery unit corresponds to the DC voltage to be supplied to the loading device in accordance with the load status of the power supply unit.

5. The uninterruptible power supply apparatus according to claim 1, wherein the first battery unit supplies power required to continuously run the loading device for a first maximum period of time when the supply of the AC power is discontinued, and the second battery unit has a plurality of battery units that includes one battery unit connected in parallel to the power supply unit, and another battery unit that is connected to the power supply unit to receive the DC current from the power supply unit, said plurality of battery units supplying power required to run the loading device for a second maximum period of time that is longer than the first maximum period of time by combining currents that are output from said plurality of battery units.

6. The uninterruptible power supply apparatus according to claim 5, wherein the power supplied by the first battery unit corresponds to the DC voltage to be supplied to the loading device when the supply of the AC power is discontinued, and the power supplied by the second battery unit corresponds to the DC voltage to be supplied to the loading device in accordance with the load status of the power supply unit.

7. The uninterruptible power supply apparatus according to claim 1, wherein the controller selectively sets, in accordance with the amount of power required by the loading device and availability of the AC power, a first control mode for operating each of the power supply unit and the first battery unit, while pausing the second battery unit.

8. The uninterruptible power supply apparatus according to claim 7, wherein the controller selectively sets, in accordance with the amount of power required by the loading device and the availability of the AC power, a second control mode for pausing each of the power supply unit and the first battery unit, while operating the second battery unit.

9. The uninterruptible power supply apparatus according to claim 8, wherein the controller selectively sets, in accordance with the amount of power required by the loading device and the availability of the AC power, a third control mode for operating each of the power supply unit, the first battery unit and the second battery unit.

10. The uninterruptible power supply apparatus according to claim 1, wherein the first battery unit charges the first battery to store power therein, by inputting part of a current from the power supply unit.

11. The uninterruptible power supply apparatus according to claim 10, wherein the second battery unit charges the second battery to store power therein from the AC power.

12. The uninterruptible power supply apparatus according to claim 1, wherein the second battery unit is configured by a plurality of battery units that are provided in parallel and each includes a DC input-type battery unit for storing power by inputting part of a current from the power supply unit and an AC input-type battery unit for storing power by inputting the AC power, and a battery provided in the AC input-type battery unit is a low rate charge/discharge battery that is capable of supplying power to the loading device for a first maximum period of time that is longer than a second maximum period of time that the DC input-type battery unit is capable of supplying power to the loading device.

13. The uninterruptible power supply apparatus according to claim 1, wherein the power supply unit and the first and second battery units are configured to be disposed and installed adjacent to each other in a rack in which a plurality of loading devices are installed.

14. An uninterruptible power supply apparatus, comprising:

a power supply unit that converts AC power to generate a DC voltage to be supplied to a loading device;

a first battery unit that is connected to the power supply unit to receive a DC current therefrom and stores first DC power generated from the DC current, the first battery unit generating a DC voltage, from the first DC power, to be supplied to the loading device;

a second battery unit that is connected in parallel to the power supply unit and stores second DC power, and generates, from the second DC power stored in the second battery unit, a DC voltage to be supplied to the loading device; and a controller that controls operation of the power supply unit, the first battery unit and the second battery unit in a correlated manner in accordance with an amount of power required by the loading device.

15. The uninterruptible power supply apparatus according to claim 14, wherein the first battery unit supplies power required to continuously run the loading device for a first maximum period of time when the supply of the AC power is discontinued, and the second battery unit has a plurality of battery units that includes one battery unit connected in parallel to the power supply unit, and another battery unit that is connected to the power supply unit to receive the DC current from the power supply unit, the plurality of battery units supplying power required to run the loading device for a second maximum period of time that is longer than the first maximum period of time by combining currents that are output from said plurality of battery units.

16. The uninterruptible power supply apparatus according to claim 15, wherein the power supplied by the first battery unit corresponds to the DC voltage supplied by the first battery unit, the DC voltage supplied by the first battery unit is supplied to the loading device when a supply of the AC power is discontinued, and the power supplied by the second battery unit corresponds to the DC voltage supplied by the second battery unit, the DC voltage supplied by the second battery unit is supplied to the loading device in accordance with a load status of the power supply unit.

17. The uninterruptible power supply apparatus according to claim 14, wherein the controller selectively sets, in accordance with the amount of power required by the loading device and availability of the AC power, a first control mode for operating each of the power supply unit and the first battery unit, while pausing the second battery unit.

18. The uninterruptible power supply apparatus according to claim 17, wherein the controller selectively sets, in accordance with the amount of power required by the loading device and the availability of the AC power, a second control mode for pausing each of the power supply unit and the first battery unit, while operating the second battery unit.

19. The uninterruptible power supply apparatus according to claim 18, wherein the controller selectively sets, in accordance with the amount of power required by the loading device and the availability of the AC power, a third control mode for operating each of the power supply unit, the first battery unit and the second battery unit.

* * * * *